(12) United States Patent
Bronk (10) Patent No.: US 11,902,453 B2
(45) Date of Patent: Feb. 13, 2024

(54) METHOD, SYSTEM AND APPARATUS FOR DELAYED PRODUCTION CODE SIGNING FOR HETEROGENEOUS ARTIFACTS

(71) Applicant: Intel Corporation, Santa Clara, CA (US)

(72) Inventor: Mateusz Bronk, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 407 days.

(21) Appl. No.: 17/358,658

(22) Filed: Jun. 25, 2021

(65) Prior Publication Data
US 2022/0021546 A1 Jan. 20, 2022

(51) Int. Cl.
H04L 9/32 (2006.01)
G06F 11/36 (2006.01)
G06F 8/71 (2018.01)

(52) U.S. Cl.
CPC .............. *H04L 9/3265* (2013.01); *G06F 8/71* (2013.01); *G06F 11/3668* (2013.01)

(58) Field of Classification Search
CPC ... H04L 9/3265; H04L 9/0836; H04L 9/0891; H04L 9/3247; G06F 8/71; G06F 11/3668; G06F 21/12; G06F 21/64
See application file for complete search history.

(56) References Cited

U.S. PATENT DOCUMENTS

| | | | | |
|---|---|---|---|---|
| 6,275,938 B1 * | 8/2001 | Bond | ........................ | G06F 21/53 714/38.14 |
| 8,832,454 B2 * | 9/2014 | Khosravi | ................... | G06F 21/64 713/187 |
| 8,954,732 B1 * | 2/2015 | Watsen | ................... | H04L 9/3247 713/157 |
| 2005/0246523 A1 * | 11/2005 | Mauro | ................... | H04L 9/3263 713/156 |
| 2005/0282637 A1 * | 12/2005 | Gatto | ...................... | H04L 67/34 463/42 |

(Continued)

FOREIGN PATENT DOCUMENTS

| CN | 101425114 A | * | 5/2009 | |
|---|---|---|---|---|
| CN | 1950798 B | * | 4/2010 | ............... G06F 8/61 |

(Continued)

OTHER PUBLICATIONS

Kristian Kozak, Issued for Abuse: Measuring the Underground Trade in Code Signing Certificates, [Submitted on Mar. 8, 2018 (v1), last revised Feb. 14, 2019 (this version, v3)], pp. 1-18 (Year: 2018).*

*Primary Examiner* — Shahriar Zarrineh
(74) *Attorney, Agent, or Firm* — Spectrum IP Law Group (57) ABSTRACT

The disclosed embodiments enable applying production nature to a software signature post-build (or even post-release), where the signature type is determined by the existence of a production-signed intermediate CA certificate—either hosted in the cloud (for pure release immutability), or re-ingested into the package (if certain modification are allowed). This allows a so-called deferred issuance of the product release. Even if the CA certificate is to be reinserted into the package, this modification likely affects only the delivery shell (e.g., installer) and may not require format-specific binary changes of, possibly heterogeneous, artifacts therein.

24 Claims, 5 Drawing Sheets

(56) References Cited

U.S. PATENT DOCUMENTS

| | | | |
|---|---|---|---|
| 2006/0184798 A1* | 8/2006 | Yaldwyn | G06F 21/64 |
| | | | 713/180 |
| 2007/0271552 A1* | 11/2007 | Pulley | G06F 9/453 |
| | | | 717/120 |
| 2013/0132936 A1* | 5/2013 | Wang | G06F 8/65 |
| | | | 717/170 |
| 2013/0165211 A1* | 6/2013 | Graham | G07F 17/3241 |
| | | | 463/25 |
| 2018/0204009 A1* | 7/2018 | Xu | G06F 8/71 |
| 2019/0042730 A1* | 2/2019 | Yamada | G06F 21/554 |
| 2019/0095184 A1* | 3/2019 | Bruderek | G06F 9/45558 |
| 2020/0177397 A1* | 6/2020 | Harrington | H04L 9/3297 |
| 2022/0224546 A1* | 7/2022 | Cao | H04L 9/006 |
| 2022/0284101 A1* | 9/2022 | Simon | H04L 9/3247 |

FOREIGN PATENT DOCUMENTS

| | | | | |
|---|---|---|---|---|
| CN | 101425114 B | * | 8/2010 | |
| CN | 103338450 A | * | 10/2013 | G06F 21/57 |
| CN | 105678118 A | * | 6/2016 | |
| CN | 107358091 A | * | 11/2017 | G06F 21/121 |
| CN | 109255232 A | * | 1/2019 | G06F 21/51 |
| EP | 4013002 A1 | * | 6/2022 | H04L 63/123 |
| WO | WO-2005109141 A2 | * | 11/2005 | G06F 21/64 |

\* cited by examiner

METHOD, SYSTEM AND APPARATUS FOR DELAYED PRODUCTION CODE SIGNING FOR HETEROGENEOUS ARTIFACTS

FIELD

The disclosure generally relates to method, system and apparatus for delayed production code signing for heterogeneous artifacts. More particularly, some embodiments enable post build (or post modification) to a software package without re-signing at the package level.

BACKGROUND

Conventional Information Technology (IT) ecosystems require that all of the released software to be verifiable in terms of the software's integrity and provenance. Conventionally, this is typically accomplished by the use of digital signatures.

It is critically important for software vendors to ensure that only vetted, legitimate releases are signed with company's so-called production identity. Signing a potentially malicious package may lead to serious consequences (consider, for example, supply chain attacks, loss of credibility, etc.) The digital signature process is typically scrutinized, and it involves human actor's approval, AI-based anomaly analysis, etc. These processes are in addition to regular code quality checks such as automated test harnesses, scanners, etc. By way of example, certain conventional processes prohibit signing non-production-worthy software with a production key.

The signature is typically embedded into the software itself. The embeddedness is N layers deep, if including installers/packaging. This introduces a chicken-and-egg problem, as one cannot production-sign a release, until it is production worthy (which implies validated). Yet since the act of (re)signing changes the release package contents, one cannot fully claim production-worthiness, until the exact contents of the final package have been tested. While the tests should target final build and not the release candidate yet at the same time such a build cannot exist until the tests have been run.

The conventional solutions for addressing these problem are several fold. The first solution involves rebuilding everything (from the same codebase as prod-candidate), though using PROD code signing key on a rebuild (instead of preprod, which is a default). This solution, while widely adopted has several risky assumptions. First, it assumes that the subsequent builds off the same codebase are 100% repeatable. Second, the solution is susceptible to a Time-of-check-Time-of-Use (TOCTOU) type attacks, where an adversary injects rogue payload after validation and just before the signing event.

A second solution is to delay signing. This reserves space for signature in the binary code which will be injected at a later time (e.g., MSFT.NET assembly signing technique). A third solution is to detach the signatures from binaries being distributed (e.g., Java JAR signing technique). These solutions are viable for technologies and packaging systems which were designed to allow this mode of operation. However, these solutions fall short when the artifact to sign is complex (e.g., in the presence of heterogeneous types of signed files, nesting of packages etc.) and require binary modification, which affects observability and may still invalidate previous test results (the binary being tested is still not byte-for-byte equal to the on released—which again opens up a point in time for a potential adverse payload injection).

A fourth solution is cross-signing or countersignatures. With this technique, the signing key is cross-certified (i.e., countersigned) by another certified authority at a later time. This solution uses static, established key and certificate hierarchies, and is mostly used for establishing proper chain of custody and entity-level trust relationship (plus time-stamping—e.g., Authenticode by Microsoft®), but not for solving the "pre-prod" vs. "production" nature of the signed binaries.

BRIEF DESCRIPTION OF THE DRAWINGS

So that the manner in which the herein recited features of the present embodiments can be understood in detail, a more particular description of the embodiments may be had by reference to embodiments, some of which are illustrated in the appended drawings. It is to be noted, however, that the appended drawings illustrate only typical embodiments and are therefore not to be considered limiting of their scope. In the drawings, similar elements are numbered similarly.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

In cryptography, a Certificate Authority or Certification Authority (CA) is an entity that issues digital certificates. A digital certificate certifies the ownership of a public key by the named subject of the certificate. This allows others (i.e., relying parties) to rely upon signatures or on assertions made about the private key that corresponds to the certified public key. A CA acts as a trusted third party, which is trusted both by the subject (owner) of the certificate and by the party relying upon the certificate. The format of such a certificate is specified by, for example, the X.509 standard. The X.509 standard is used online and offline applications such as electronic signatures. An X.509 certificate contains a public key and an identity (a hostname, an organization, an individual), and is either signed by a CA or is self-signed. When a certificate is signed by a trusted CA, or validated by other means, someone holding that certificate can rely on the public key it contains to establish secure communications with another party or validate documents digitally signed by the corresponding private key.

When a new software version issues, the conventional authentication techniques require verification of the released version of the software to ensure the software's integrity and provenance. Conventionally, this has been accomplished by using digital signatures and a trusted CA. It is critical to a software vendor that only the legitimate version releases are signed with company's production identity. Digitally signing a potentially malicious package may lead to serious breach. To this end, the digital signature process is heavily scrutinized and has evolved to include one or more of: requiring human approvals as well as conducting AJ-based anomaly analysis. These processes are in addition to the regular code quality checks such as automated test harnesses, scanners, etc. Moreover, conventional processes typically prohibit signing non-production-worthy software with a production key.

As discussed above, the CA signature is typically embedded N layers deep into the software itself. This introduces a problem of identifying the final version. Because the CA signature is embedded N layers deep, the act of signing necessarily changes the content of the software which would invalidate the version as a production version. That is, a subsequent signing invalidate the previous test results because it creates a new artifact which hasn't been tested as a whole unit. This in turn may cause the release not really being the production release that was meant to be approved.

The disclosed embodiments address the production signing and release sequencing dilemmas by devising a method to avoid changing the binary post-build. In one embodiment, this is done by changing the nature of a signature (e.g., transform from debugging (DBG) signature or re-release/re-production software to a Product (PROD) signature) after the initial signing. In certain embodiment, this is done without changing a single bit in the software release so as to not invalidate the test results. In other words, certain disclosed embodiments promote a software build to production-worthy without re-signing at the package level.

In one embodiment, a temporal (one-time) signing key is combined with delayed (product) cross-signature to convert an earlier debug signature into a production signature after the original (or initial product) release is signed. This maintains compatibility with the existing verification while allowing post-signature release. In one application, the disclosed method is accomplished by (re)certifying the (one-time) Issuing (CA) key/certificate with a PROD root key only after certain quality gate is reached.

The mere use of temporal CA certificates allow pinpoint revocation of singed binaries using standard x.509 revocation methods. Certain of the disclosed embodiments also allow robust and efficient signing operation, as most need to early production-signature are no longer a concern, allowing a shift-left, while thoroughly validating and without compromising process integrity.

Figure 1:
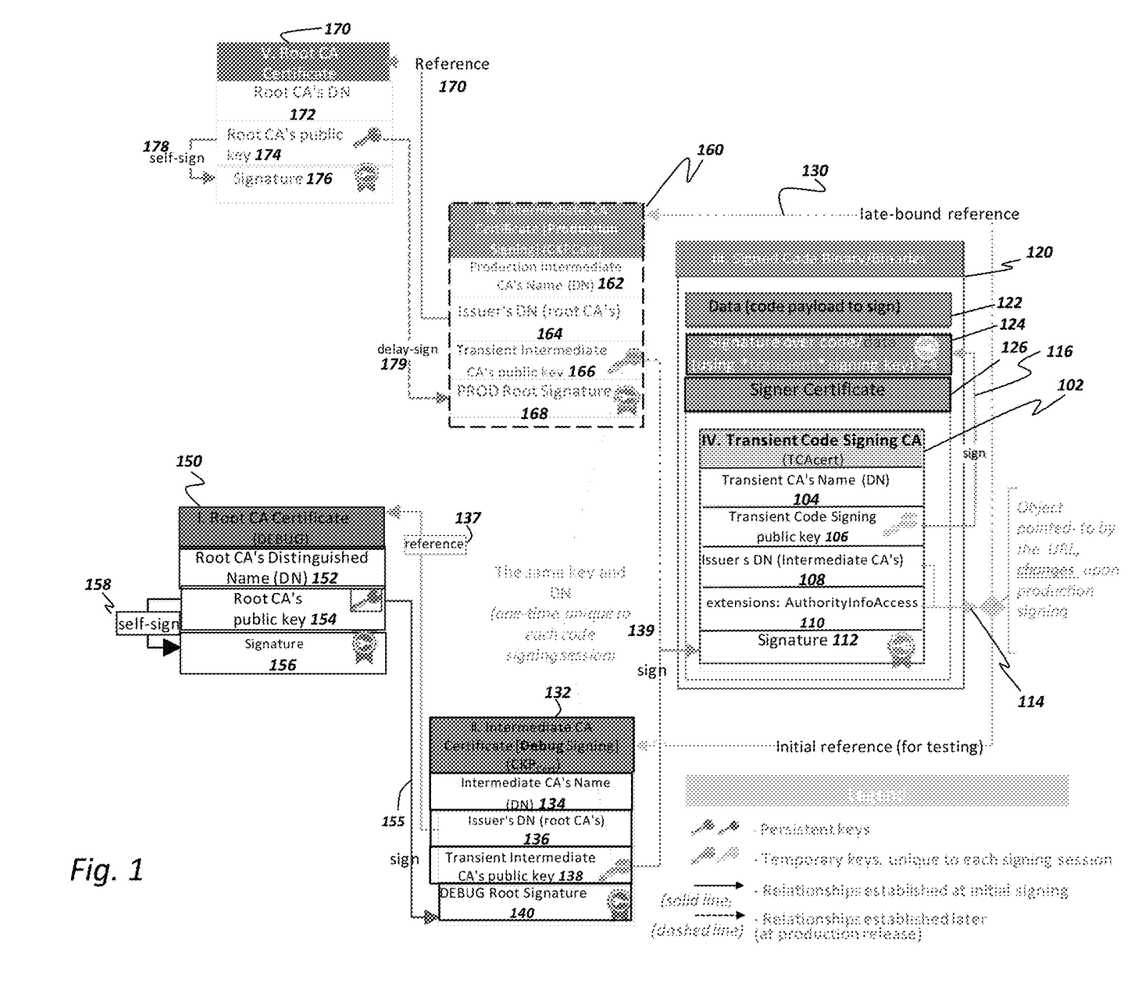
FIG. 1 illustrates an exemplary object hierarchy according to one embodiment of the disclosure.

FIG. 1 illustrates an exemplary object hierarchy according to one embodiment of the disclosure. Specifically, FIG. 1 shows an exemplary hierarchy use for the default/basic mode of signing operation in which transient code signing key pairs and transient code signing CA are provided to delay final product release code signing. The certificate hierarchy of FIG. 1 is simplified to exclude the typical tiers of issuing Certificate Authorities (CA). The embodiment of FIG. 1 also introduces the additional certificate, TCA$_{cert}$, which is a joint/pointer to a CKPCert. CKPCert is an ephemeral part of the solution as described below.

The following notation is used herein: TCA—Transient Codesigning CA; TCA$_{Cert}$—Transient Codesigning CA's certificate (TCA$_{Cert}$ which is also known as Ephemeral Code Signing CA Certificate is the a Signer Certificate); TKP—Transient Key Pair (for code signing; also known as Ephemeral Code Signing Key (pair); CKP$_{Cert}$—(Intermediate) CA Key Pair's Certificate (also knowns as Ephemeral Intermediate CA Certificate); CKP—(Intermediate) CA Key Pair; CKP_priv/CKP_pub—private/public part of CKP pair; TKP_priv/TKP_pub—private/public part of TKP pair. each of these notations is discussed below and in reference to the disclosed principles.

In FIG. 1, component 120 represents the Signed Code Binary/Binaries which includes data 122 (the code payload to be signed), signature over code/data using the transient signing key (as described in relation to TCA$_{cert}$ 102) and signer certificate 126. TCAcert 102 components include: a transient CA's Distinguished Name (DN) 104, transient code signing public key TCA$_{Pub}$ 106, and a signature 112 which is issued by a transient Certificate Authority (CKP), whose identity is referenced by an "Issuer's DN" field 108.

Transient code signing CA (TCA$_{cert}$) 102 may be a one-time use key. The TCA$_{cert}$ 102 references transient CA's name Distinguished Authority (DN) 104, transient code signing public key TCA$_{Pub}$ 106, Issuer's DN which may be an intermediate CA, X.509 Certificate Extensions (Authority Information Access) 110 containing an URL for the certificate of CKP. In such an embodiment, the content of the URL may initially point to a non-production-worthy (DBG) CKP$_{cert}$ 132, and may change as the code signing advances to the final product code signing—to point to a production-worthy (PROD) CKPcert 160. Arrow 114 illustrates the output of TCA$_{cert}$. In one embodiment, the output may be a URL which points to a first content. The URL content may change as the code signing advances to the final product code signing. It should be noted that the use of the URL is optional, and the disclosed principles may be implemented without requiring a URL pointer or the URL content.

In another embodiment, the creation of CKPcert (either 132 or 160 or both) may be deferred till after the software package is signed (that is, a TCAcert 102 is allowed to exist even before its parent certificate CKPcert is created).

In some embodiments of the disclosure, Transient Code Signing public key 106 (TCA$_{Pub}$) is a one-time signing key which may be used as signature over code/data as illustrated by arrow 116. The Signer Certificate 126 is a container/function of 102. In some embodiments of the disclosure, Transient Code Signing key pair (public part thereof depicted as 106 TCA$_{Pub}$) is a one-time signing key which may be used to produce a signature over code/data as illustrated by arrow 116.

As stated, in one, a temporal (one-time) signing key is combined with delayed (product) cross-signature to convert an earlier debug signature into a production signature after the original (or initial product) release is signed. This is schematically illustrated in FIG. 1 where Intermediate CA certificate (CKP$_{cert}$) is used to certify 139 the transient code signing public key 106. CKP$_{cert}$ may define the debug signing CA 132. CKP$_{cert}$ 132 may be provisioned by inter-mediate CA Name (DN) 134, Issuer's DN (root CA) 136, transient Intermediate CA's public key 138 and Debug Root Signature 140 or (at a later stage) a production signing CA 160.

Debug Root Signature 140 is predicted on Root CA Certificate 150 and may be created for the purpose of software debug or validation. Debug root CA Certificate 150, which is issued for a Root CA's DN 152, and Root CA's public Key 154 may be used. Such a certificate may further be self-signed (158), that is: assembled in such a way where the signature field 156 is issued using the private component of the same key pair as the one being certified by field 154.

The private part of the Transient Intermediate CA Public Key CKP 138 may be used to compute a signature of TCAcert 102 as indicated by arrow 139. generate (or derive) Transient Code Signing Public Key 106 as indicated by arrow 139. The (same) Transient Intermediate CA Public Key CKP may also be used (as 166) in issuance of a production CKPCert (160)—thus enabling a (delayed) production signing. That is the same Key and DN may be used for both purposes. The Key 138 and DN may be unique to each code and signing session. The delayed issuance of $CKP_{cert}$ will enable a delayed signing of the production code according to one embodiment of the disclosure. $CKP_{cert}$ may be issued by a Production Root CA Certificate 170.

Upon final release of the software package, a production-worthy CKPCert 160 may be issued or made available, which may reference a 170 Root CA Certificate 170 (PROD Certificate). PROD Certificate 170 may be provisioned with Root CA's DN 172, Root CA's public key 174 and Root Signature 176. Root CA's public key 174 may be self-signing 178.

It should be noted that the key/certificate hierarchy object of FIG. 1, from highest to lowest, is: Root CA Certificate (either 170 or 150), Intermediate CA Certificate (either 160 or 132), Transient Code Signing CA Certificate (102). In other words, there is no relationship between 170 or 150 etc.; rather they are siblings. They may be considered as two branches: Branch (A) (debug hierarchy, optional) 150->132->102; and Branch (B) (prod hierarchy, established only once production release is approved): 170->160->102 . . . ), where deferred creation of entity 160 is the main goal.

It should also be noted that the application of $TCA_{cert}$ 102 is optional. The disclosed principles of delaying signing by using $CKP_{Cert}$ may be done independently of $TCA_{cert}$.

Figure 2:
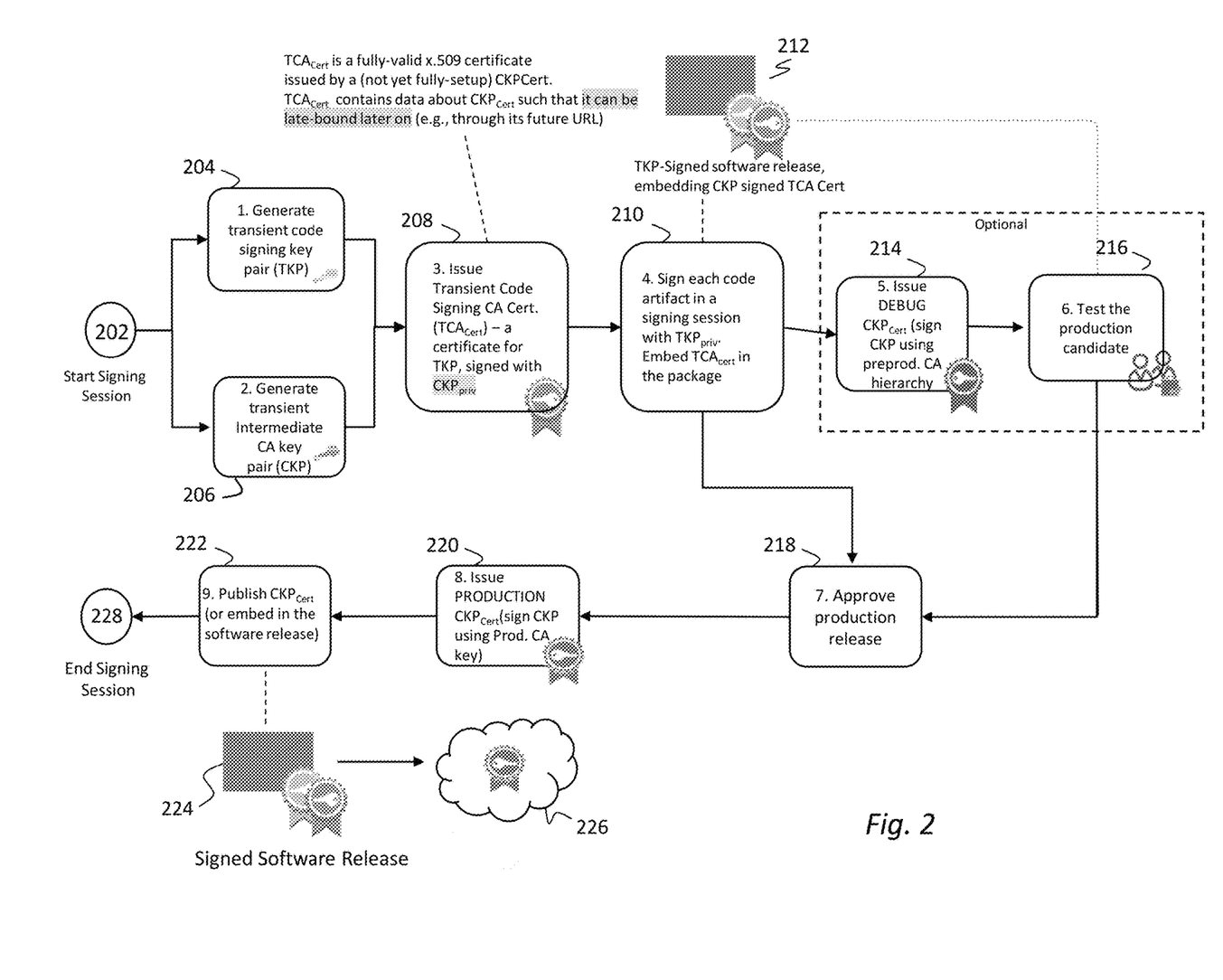
FIG. 2 schematically illustrates a flow-diagram for delayed code signing according to one embodiment of the disclosure.

FIG. 2 schematically illustrates a flow-diagram for delayed code signing according to one embodiment of the disclosure. The signing session starts at step 202. At step 204 a general transient code signing key pair (TKP) is formed. TKP may be used as an interim key for the purpose of producing a code integrity signature over a particular software pack. At step 206, the Transient Intermediate CA key pair (CKP) is generated.

At step 208, the system issues a Transient Code Signing CA Certificate ($TCA_{Cert}$). The $TCA_{Cert}$ is a certificate for TKP and may be issued by a Certificate Authority. In one embodiment of the disclosure, $TCA_{Cert}$ may be signed with $CKP_{Priv}$. $CKP_{Priv}$ denotes the private key for the Transient Intermediate CA Key Pair (referring to FIG. 1, Keys 166/138 are the public part of the pair).

$TCA_{Cert}$ may be a fully-valid x.509 certificate issued by a (not yet fully-setup) $CKP_{Cert}$. In one embodiment, $TCA_{Cert}$ may contain enough data about $CKP_{Cert}$ so that it can be late-bound in future (e.g., its future URL). In one implementation, the following need to be known at this stage: (1) the Distinguished Name of the CKPcert (FIG. 1, components 162 and 134), and (2) Value of the signature (FIG. 1, component 112) issued by CKP_priv (alas, the CKP key pair must exist (as setup in step 206 and later-referred-to in components 138/166 of FIG. 1). Additionally, values such as the (future) URL of CKPCert may be established at this time and embedded in TCA_cert (as 110). This URL content may change upon production signing.

At step 210, each code artifact at a signing session is signed with $TKP_{Priv}$. In addition. $TCA_{cert}$ is embedded in the package. At this time, the TKP-signed software may be released with embedded CKP-signed $TCA_{cert}$. This is schematically illustrated as 212.

At step 214, a debug $CKP_{cert}$ may be issued. The CKP may be signed using conventional pre-production CA hierarchy which may terminate in a self-signed DBG root CA certificate (e.g., 150).

At step 216, the production software candidate may be tested and verified. Steps 214 and 216 may be optionally implemented. If steps 214 and 216 are not implemented, then the flow diagram goes to step 218. At step 218, the production version of the software may be approved to be released (i.e., the authorization for production-signing a release is acquired as per software vendor's internal process). Step 218 may be implemented at a later time and subsequent to the prior steps. The production release approval may entail additional steps which are not discussed for brevity.

At step 220, a production $CKP_{Cert}$ is issued (see also step 160 $CKP_{cert}$ 160, FIG. 1). The $CKP_{Cert}$ may be signed using Production CA key. The Production CA key may define the root Certificate Authority's public key. At step 222, the CKPcert is published. Alternatively, CKPcert may be embed in the software release as schematically indicated at steps 224, 226. The process ends at step 228.

The certificate hierarchy is simplified for illustration purposes. While the hierarchy is discussed in relation to two temporary keys, it is noted that more (or less) than two temporary keys may be used without departing from the disclosed principles. Further, the exemplary illustrations of FIGS. 1 and 2 does not include the typical tiers of issuing CA and introduces an additional certificate provision IV-$TCA_{cert}$ (FIG. 1, 102) which may be considered as a joint/pointer to a provision II/IV—$CKP_{cert}$ (FIG. 1, 132) which is an integral part of the embodiment.

Thus, in FIG. 2 two one-time/transient key pairs (KPs) are generated by the CA: one for software signing itself (TKP, the public part thereof is shown as component 106 in FIG. 1), and the second key pairs for the intermediate CA (CKP, the public part thereof is shown as components 138 and 166 in FIG. 1). Note that, while the CKP key pair may be superfluous, it allows the generation of an immutable certificate for TKP, thus enabling compatibility with existing code signing solutions (PKCS/x.509), as the resulting $TCA_{cert}$ can be embedded into the signed software (similar to conventional code signing). As described below in greater detail, $TCA_{cert}$ may include an "AuthorityInfoAccess" extension with a pre-populated URI which will host production $CKP_{cert}$, if/once it gets issued, allowing generic x.509 verification to be performed.

As illustrated, in one embodiment, the issuance of a CKPcert (issuing certificate for $TCA_{Cert}$) is delayed or deferred until a production gate is reached (i.e., the code signature is valid, but cannot be trusted, as the CA chain does not terminate in any known trust anchor). This reverses the typical x.509 chain build-out, as the issuing CA certificate is created later than the child certificate that it has issued. In an alternative flow for CA software compatibility, a 'debug' $CKP_{cert}$ may be issued and a production $CKP_{Cert}$ may be instituted by counter-signing it with a production root.

Certain other embodiments of the disclosure include the following:

First, if signing certificate is distributed separately from the software package release or can be injected without invalidating its integrity, then transient Intermediate CA may be removed and a single key pair may be used (i.e., sign TCAcert directly with (pre)production key hierarchy).

Second, the production CKPCert may be encrypted, issued and placed in escrow into the release package (i.e., release decryption key only when the production quality gate is reached).

Third, external events may be used to create trust into CKPcert (for example, issue CKPcert with ValidFrom date set in the future (creating an impending production release), and revoke it (i.e., publish on a CRL) if production gate is not reached during a certain timeframe.

Fourth, blockchain or smart contracts may be used to validate $CKP_{cert}$.

The disclosed embodiments enable applying production nature to a software signature post-build (or even post-release), where the signature type is determined by the existence of a production-signed intermediate CA certificate—either hosted in the cloud (for 'pure' release immutability), or re-ingested into the package (if certain modification are allowed). Even if the CA certificate is to be reinserted into the package, this modification likely affects only the delivery shell (e.g., installer) and may not require format-specific binary changes of, possibly heterogeneous, artifacts therein.

In certain embodiments, the disclose provides methods and systems to turn-apply production nature to a software signature post-build (or even post-release), where the signature type is determined by the existence of a production signed intermediate CA certificate—either hosted in the cloud (for 'pure' release immutability), or re-ingested into the package (if certain modification are allowed). In the embodiment where the CA certificate is to be reinserted into the package, this modification may affect only the delivery shell (e.g., installer) and does not require format-specific binary changes of, possibly heterogeneous, artifacts therein.

Figure 3:
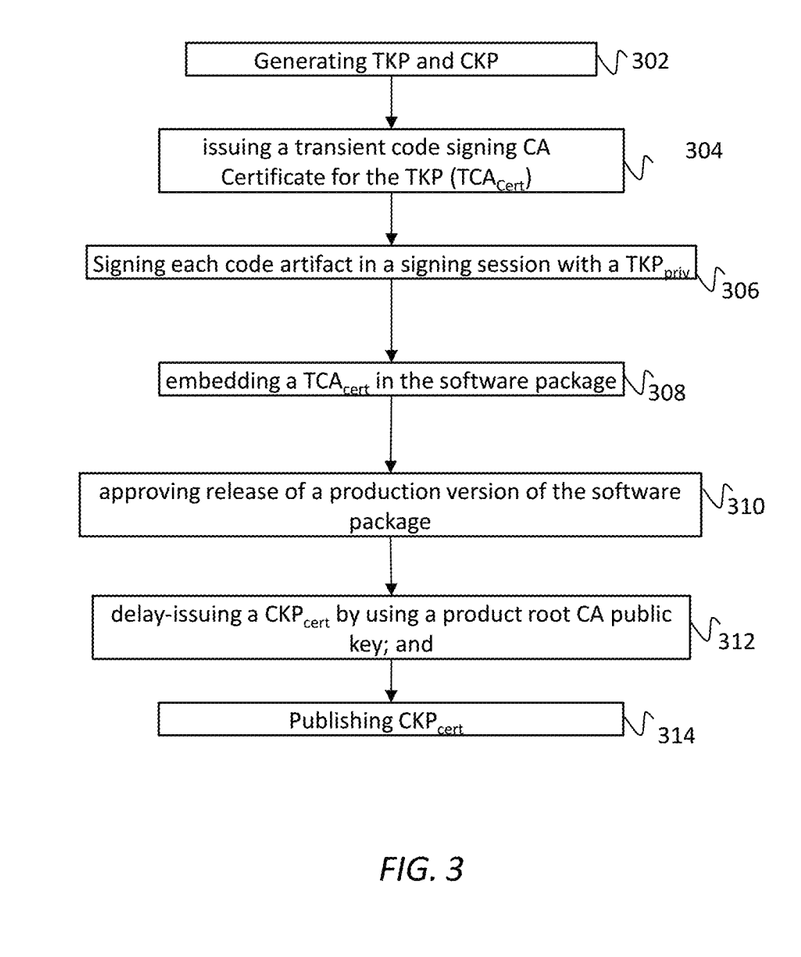
FIG. 3 is a flow diagram for implementing an exemplary embodiment of the disclosure.

FIG. 3 is a flow diagram for implementing an exemplary embodiment of the disclosure. Specifically, FIG. 3 illustrates a flow diagram for an exemplary method to delay production code signing for a software package. The delay code signing allows a so-called deferred issuance of the product release to enable post build (or post modification) to a software package without re-signing at the package level. The method of FIG. 3 starts at step 302 by generating a transient code signing key pair (TKP) and a transient intermediate code key pair (TKP). At step 304, a transient code signing CA Certificate for the TKP ($TCA_{Cert}$) is issued. $TCA_{Cert}$ may be signed with a $CKP_{Priv}$. In certain embodiment, $TCA_{Cert}$ contains data relating to the $CKP_{Cert}$ such that the $CKP_{Cert}$ can be bound to a subsequently issued CKPcert including a PROD CKPCert published at the location pointed-to by the URL embedded in the TCAcert upon production release approval. At step 306, each code artifact is signed at a signing session with $CKP_{Priv}$. At step 308, TCAcert is embedded in the software package. In one embodiment, the embedded $TCA_{cert}$ is a valid x.509 certificate issued by the $CKP_{cert}$. At step 310, the production version of the software package is approved. In one embodiment, approving the production release of the software package may further include testing the production version of the software package prior to publishing the $CKP_{cert}$. Finally, at step 312. $CKP_{Cert}$ is delay-issued by using a product root CA public Key. At step 314, $CKP_{Cert}$ is published.

Figure 4:
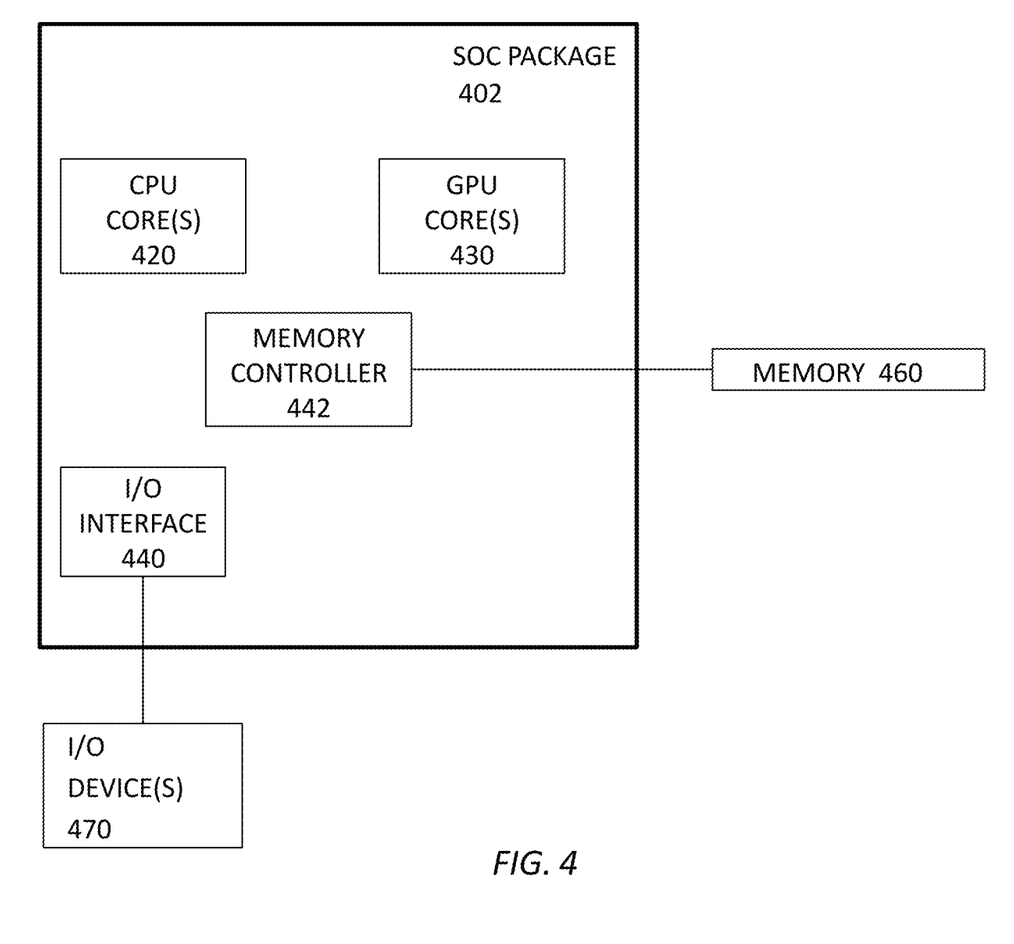
FIG. 4 illustrates a block diagram of an SOC package to implement certain embodiments of the disclosure.

FIG. 4 illustrates a block diagram of an SOC package to implement certain embodiments of the disclosure. The disclosed principles of FIGS. 1-3 may be implemented in one or more SoCs as described in relation to FIG. 4. As illustrated in FIG. 4, SOC 402 includes one or more Central Processing Unit (CPU) cores 420, one or more Graphics Processor Unit (CPU) cores 430, an Input/Output (U/O) interface 440, and a memory controller 442. Various components of the SOC package 402 may be coupled to an interconnect or bus such as discussed herein with reference to the other figures. Also, the SOC package 402 may include more or less components, such as those discussed herein with reference to the other figures. Further, each component of the SOC package 420 may include one or more other components, e.g., as discussed with reference to the other figures herein. In one embodiment, SOC package 402 (and its components) is provided on one or more Integrated Circuit (IC) die, e.g., which are packaged into a single semiconductor device.

As illustrated in FIG. 4, SOC package 402 is coupled to a memory 460 via the memory controller 442. In an embodiment, the memory 460 (or a portion of it) can be integrated on the SOC package 402.

The I/O interface 440 may be coupled to one or more I/O devices 470, e.g., via an interconnect and/or bus such as discussed herein with reference to other figures. I/O device (s) 470 may include one or more of a keyboard, a mouse, a touchpad, a display, an image/video capture device (such as a camera or camcorder/video recorder), a touch screen, a speaker, or the like.

Figure 5:
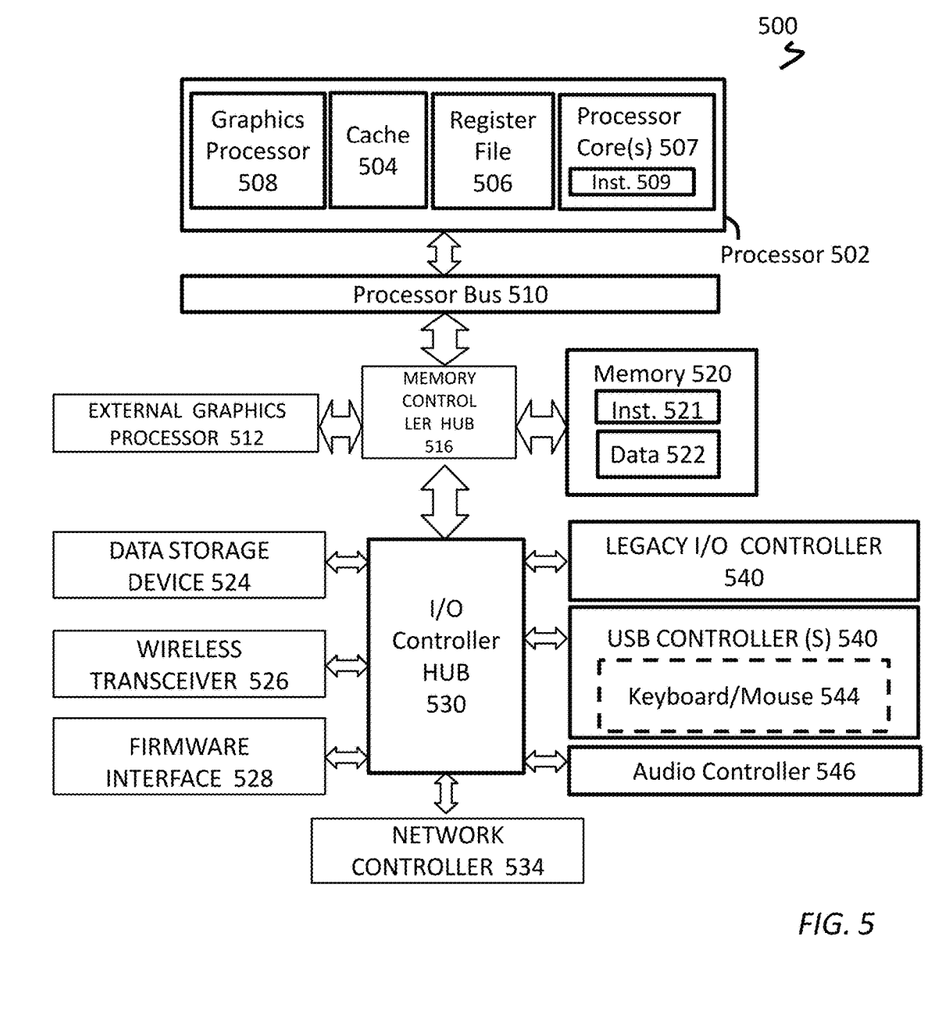
FIG. 5 is a block diagram of a processing system and an environment to implement the disclosed embodiments.

FIG. 5 is a block diagram of a processing system and an environment to implement the disclosed embodiments. System 500 of FIG. 5 may be used to implement one or more of the disclosed principles. In various embodiments the system 500 includes one or more processors 502 and one or more graphics processors 508, and may be a single processor desktop system, a multiprocessor workstation system, or a server system having a large number of processors 502 or processor cores 507. In on embodiment, the system 500 is a processing platform incorporated within a system-on-a-chip (SoC or SOC) integrated circuit for use in mobile, handheld, or embedded devices.

An embodiment of system 500 can include, or be incorporated within a server-based gaming platform, a game console, including a game and media console, a mobile gaming console, a handheld game console, or an online game console. In some embodiments system 500 is a mobile phone, smart phone, tablet computing device or mobile Internet device. Data processing system 500 can also include couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 508.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 507 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-3 (L3) cache or Last Level Cache (LLC)) (not shown), which may be shared among processor cores 507 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, processor 502 is coupled to a processor bus 510 to transmit communication signals such as address, data, or control signals between processor 502 and other components in system 500. In one embodiment the system 500 uses an exemplary 'hub' system architecture, including a memory controller hub 516 and an Input Output (I/O) controller hub 530. A memory controller hub 516 facilitates communication between a memory device and other components of system 500, while an I/O Controller Hub (ICH) 530 provides connections to I/O devices via a local I/O bus. In one embodiment, the logic of the memory controller hub 516 is integrated within the processor.

Memory device 520 can be a dynamic random-access memory (DRAM) device, a Static Random Access Memory (SRAM) device, flash memory device, phase-change memory device, or some other memory device having suitable performance to serve as process memory. In one embodiment the memory device 520 can operate as system memory for the system 500, to store data 522 and instructions 521 for use when the one or more processors 502 executes an application or process. Memory controller hub 516 also couples with an optional external graphics processor 512, which may communicate with the one or more graphics processors 508 in processors 502 to perform graphics and media operations.

In some embodiments, ICH 530 enables peripherals to connect to memory device 520 and processor 502 via a high-speed I/O bus. The I/O peripherals include, but are not limited to, an audio controller 546, a firmware interface 528, a wireless transceiver 526 (e.g., Wi-Fi, Bluetooth), a data storage device 524 (e.g., hard disk drive, flash memory, etc.), and a legacy I/O controller 540 for coupling legacy (e.g., Personal System 2 (PS/2)) devices to the system. One or more Universal Serial Bus (USB) controllers 542 connect input devices, such as keyboard and mouse 544 combinations. A network controller 534 may also couple to ICH 530. In some embodiments, a high-performance network controller (not shown) couples to processor bus 510. It will be appreciated that the system 500 shown is exemplary and not limiting, as other types of data processing systems that are differently configured may also be used. For example, the I/O controller hub 530 may be integrated within the one or more processor 502, or the memory controller hub 516 and I/O controller hub 530 may be integrated into a discreet external graphics processor, such as the external graphics processor 512.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

In various embodiments, one or more operations discussed with reference to FIG. 1 et seq. may be performed by one or more components (interchangeably referred to herein as "logic") discussed with reference to any of the figures. In various other embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The following embodiments are presented to further illustrates applications of the disclosed principles. The presented embodiments are exemplary and non-limiting.

Example 1 relates to a method to delay production code signing for a software package, the method comprising: generating a transient code signing key pair (TKP) and a transient intermediate code CA key pair (CKP); issuing a transient code signing CA Certificate for the TKP ($TCA_{Cert}$), wherein the $TCA_{Cert}$ is signed with a $CKP_{Priv}$; signing each code artifact in a signing session with a $TKP_{priv}$; embedding a $TCA_{cert}$ in the software package; approving production release of a production version of the software package; delay-issuing a $CKP_{cert}$ by using a product root CA public key; and publishing a CKPcert; wherein publishing $CKP_{cert}$ further comprises publishing the $CKP_{cert}$ at a pre-defined location pointed-to by $TCA_{cert}$ embedding.

Example 2 is directed to the method of Example 1, wherein the embedded $TCA_{cert}$ is a valid x.509 certificate issued by the $CKP_{cert}$.

Example 3 is directed to the method of Example 1, wherein the $TCA_{cert}$ embedded in the software package contains a URL address pointing to a location where a CKPcert can be retrieved from.

Example 4 is directed to the method of Example 3, wherein the $TCA_{cert}$ contains data relating to the $CKP_{Cert}$ such that the $CKP_{Cert}$ can be bound to a subsequently issued $CKP_{cert}$.

Example 5 is directed to the method of Example 4, wherein the $TCA_{Cert}$ contains data relating to the CKPcert such that the $CKP_{Cert}$ can be bound to a subsequently issued CKPcert including a PROD CKPCert published at the location pointed-to by the URL embedded in the TCAcert upon production release approval.

Example 6 is directed to the method of Example 1, wherein the CKP is a unique one-time key pair to each code signing session.

Example 7 is directed to the method of Example 1, wherein the embedded $TCA_{cert}$ is issued by the $CKP_{cert}$.

Example 8 is directed to the method of Example 1, further comprising issuing a $CKP_{cert}$ by signing the CKP with a pre-production CA hierarchy.

Example 9 is directed to the method of Example 1, wherein the step of approving the production release of the software package further comprises testing the production version of the software package prior to publishing the $CKP_{cert}$.

Example 10 is directed to a non-transitory machine-readable medium including instructions to delay production code signing for a heterogeneous artifacts of a pre-production version of a software package, which when executed on a processor cause the processor to implement operations comprising: generate a transient code signing key pair (TKP) and a transient intermediate code CA key pair (CKP); issue a transient code signing CA Certificate for the TKP ($TCA_{Cert}$), wherein the $TCA_{Cert}$ is signed with a $CKP_{Priv}$; sign each code artifact in a signing session with a $TKP_{priv}$; embed a $TCA_{cert}$ in the software package; approve production release of a production version of the software package; delay-issue a $CKP_{cert}$ by using a product root CA public key; and publish a CKPcert at a pre-defined location pointed-to by $TCA_{cert}$ embedding.

Example 11 is directed to the medium of Example 10, wherein the embedded $TCA_{cert}$ is a valid x.509 certificate issued by $CKP_{cert}$.

Example 12 is directed to the medium of Example 10, wherein the $TCA_{cert}$ embedded in the software package contains a URL address pointing to a location where a $CKP_{cert}$ can be retrieved from.

Example 13 is directed to the medium of Example 12, wherein the $TCA_{cert}$ contains data relating to the $CKP_{Cert}$ such that the $CKP_{Cert}$ can be bound to a subsequently issued $CKP_{Cert}$.

Example 14 is directed to the medium of Example 10, wherein the CKP is a unique one-time key pair to each code signing session.

Example 15 is directed to the medium of Example 10, wherein the embedded $TCA_{cert}$ is issued by $CKP_{cert}$.

Example 16 is directed to the medium of Example 10, wherein the instructions further cause the processor to issue the $CKP_{cert}$ by signing the CKP with a pre-production CA hierarchy.

Example 17 is directed to the medium of Example 10, wherein the instructions cause the processor to approve the production release of the software package after testing the production version of the software package prior to publishing the $CKP_{cert}$.

Example 18 is directed to a system to delay production code signing for a heterogeneous artifacts of a pre-production version of a software package, the system comprising: a processor circuitry; and a memory circuitry to communicate with the processor circuitry, the memory circuitry comprising instructions to direct the processor circuitry to: generate a transient code signing key pair (TKP) and a transient intermediate code CA key pair (CKP); issue a transient code signing CA Certificate for the TKP ($TCA_{Cert}$), wherein the $TCA_{Cert}$ is signed with a $CKP_{Priv}$; sign each code artifact in a signing session with a $TKP_{Priv}$; embed a $TCA_{cert}$ in the software package; approve production release of a production version of the software package; delay-issue a $CKP_{cert}$ by using a product root CA public key; and publish a $CKP_{cert}$ at a pre-defined location pointed-to by $TCA_{cert}$ embedding.

Example 19 is directed to the system of Example 18, wherein the embedded TCAcert is a valid x.509 certificate issued by $CKP_{cert}$.

Example 20 is directed to the system of Example 18, wherein the $TCA_{cert}$ embedded in the software package contains a URL address pointing to a location where a $CKP_{cert}$ can be retrieved from.

Example 21 is directed to the system of Example 20, wherein the CKP is a unique one-time key pair to each code signing session.

Example 22 is directed to the system of Example 18, wherein the embedded $TCA_{cert}$ is issued by $CKP_{cert}$.

Example 23 is directed to the system of Example 18, wherein the instructions further cause the processor to issue the $CKP_{cert}$ by signing the CKP with a pre-production CA hierarchy.

Example 24 is directed to the system of Example 18, wherein the instructions cause the processor to approve the production release of the software package after testing the production version of the software.

What is claimed is:

1. A method to delay production code signing for a software package, the method comprising:
    generating a transient code signing key pair (TKP) and a transient intermediate code Certificate Authority (CA) key pair (CKP);
    issuing a transient code signing CA Certificate for the TKP ($TCA_{Cert}$), wherein the $TCA_{Cert}$ is signed with a $CKP_{Priv}$;
    signing each code artifact in a signing session with a $TKP_{priv}$;
    embedding a $TCA_{cert}$ in the software package;
    approving production release of a production version of the software package;
    delay-issuing a $CKP_{cert}$ by using a product root CA public key; and
    publishing a $CKP_{cert}$;
    wherein publishing $CKP_{cert}$ further comprises publishing the $CKP_{cert}$ at a pre-defined location pointed-to by $TCA_{cert}$ embedding.

2. The method of claim 1, wherein the embedded $TCA_{cert}$ is a valid x.509 certificate issued by the $CKP_{cert}$.

3. The method of claim 1, wherein the $TCA_{cert}$ embedded in the software package contains a URL address pointing to a location where a $CKP_{cert}$ can be retrieved from.

4. The method of claim 3, wherein the $TCA_{Cert}$ contains data relating to the $CKP_{Cert}$ such that the $CKP_{Cert}$ can be bound to a subsequently issued $CKP_{cert}$.

5. The method of claim 4, wherein the $TCA_{Cert}$ contains data relating to the $CKP_{Cert}$ such that the $CKP_{Cert}$ can be bound to a subsequently issued CKPcert including a PROD CKPCert published at the location pointed-to by the URL embedded in the TCAcert upon production release approval.

6. The method of claim 1, wherein the CKP is a unique one-time key pair to each code signing session.

7. The method of claim 1, wherein the embedded $TCA_{cert}$ is issued by the $CKP_{cert}$.

8. The method of claim 1, further comprising issuing a $CKP_{cert}$ by signing the CKP with a pre-production CA hierarchy.

9. The method of claim 1, wherein the step of approving the production release of the software package further comprises testing the production version of the software package prior to publishing the $CKP_{cert}$.

10. A non-transitory machine-readable medium including instructions which when executed on a processor cause the processor to implement operations comprising:
generate a transient code signing key pair (TKP) and a transient intermediate code Certificate Authority (CA) key pair (CKP);
issue a transient code signing CA Certificate for the TKP ($TCA_{Cert}$), wherein the $TCA_{Cert}$ is signed with a $CKP_{Priv}$;
sign each code artifact in a signing session with a $TKP_{priv}$;
embed a $TCA_{cert}$ in the software package;
approve production release of a production version of the software package;
delay-issue a $CKP_{cert}$ by using a product root CA public key; and
publish a $CKP_{cert}$ at a pre-defined location pointed-to by $TCA_{cert}$ embedding;
wherein the instructions, when cause the processor to delay production code signing for a heterogeneous artifacts of a pre-production version of a software package.

11. The medium of claim 10, wherein the embedded $TCA_{cert}$ is a valid x.509 certificate issued by $CKP_{cert}$.

12. The medium of claim 10, wherein the $TCA_{cert}$ embedded in the software package contains a URL address pointing to a location where a $CKP_{cert}$ can be retrieved from.

13. The medium of claim 12, wherein the $TCA_{cert}$ contains data relating to the $CKP_{cert}$ such that the $CKP_{cert}$ can be bound to a subsequently issued $CKP_{cert}$.

14. The medium of claim 10, wherein the CKP is a unique one-time key pair to each code signing session.

15. The medium of claim 10, wherein the embedded $TCA_{cert}$ is issued by $CKP_{cert}$.

16. The medium of claim 10, wherein the instructions further cause the processor to issue the $CKP_{cert}$ by signing the CKP with a pre-production CA hierarchy.

17. The medium of claim 10, wherein the instructions cause the processor to approve the production release of the software package after testing the production version of the software package prior to publishing the $CKP_{cert}$.

18. A system comprising:
a processor circuitry; and
a memory circuitry to communicate with the processor circuitry, the memory circuitry comprising instructions to delay production code signing for a heterogeneous artifacts of a pre-production version of a software package by directing the processor circuitry to:
generate a transient code signing key pair (TKP) and a transient intermediate code CA key pair (CKP);
issue a transient code signing CA Certificate for the TKP ($TCA_{Cert}$), wherein the $TCA_{Cert}$ is signed with a $CKP_{Priv}$;
sign each code artifact in a signing session with a $TKP_{priv}$;
embed a $TCA_{cert}$ in the software package;
approve production release of a production version of the software package;
delay-issue a $CKP_{cert}$ by using a product root CA public key; and
publish a $CKP_{cert}$ at a pre-defined location pointed-to by $TCA_{cert}$ embedding.

19. The system of claim 18, wherein the embedded $TCA_{cert}$ is a valid x.509 certificate issued by $CKP_{cert}$.

20. The system of claim 18, wherein the $TCA_{cert}$ embedded in the software package contains a URL address pointing to a location where a $CKP_{cert}$ can be retrieved from.

21. The system of claim 20, wherein the CKP is a unique one-time key pair to each code signing session.

22. The system of claim 18, wherein the embedded $TCA_{cert}$ is issued by $CKP_{cert}$.

23. The system of claim 18, wherein the instructions further cause the processor to issue the $CKP_{cert}$ by signing the CKP with a pre-production CA hierarchy.

24. The system of claim 18, wherein the instructions cause the processor to approve the production release of the software package after testing the production version of the software package prior to publishing the $CKP_{cert}$.

* * * * *